United States Patent Office 3,251,850
Patented May 17, 1966

3,251,850
CERTAIN FLUORO-DICHLOROMETHYLDITHIO-BENZAZOLE COMPOUNDS
Engelbert Kühle, Cologne-Stammheim, Erich Klause, Cologne-Flittard, and Gunter Unterstenhofer, Opladen, Germany, assignors to Farbenfabriken Bayer Aktiengesellschaft, Leverkusen, Germany, a corporation of Germany
No Drawing. Filed Oct. 16, 1962, Ser. No. 231,036
Claims priority, application Germany, Nov. 3, 1961, F 35,277
5 Claims. (Cl. 260—306.5)

In U.S. application Serial No. 148,845, filed October 31, 1961, sulphenic acid derivatives of the general formula

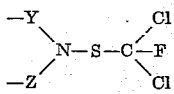

are described which are obtained by reacting corresponding imino-compounds with dichloro-fluoro-methane sulphenic acid chloride.

In the aforesaid formula Y and Z represent CO- and/or $SO_2$-groups which are further linked with a similar or different organic radical, an optionally substituted amino group or a common organic radical (with ring coupling); Z can also stand for an organic radical which is linked to the nitrogen optionally via another hetero atom.

The aforesaid compounds show a quite remarkable fungicidal activity at a relatively good plant tolerance.

It has now been found that insecticidal and acaricidal and partly also fungicidal derivatives of fluoro-dichloro-methane sulphenic acid are obtained if fluoro-dichloro-methane sulphenic acid chloride is caused to react with compounds of the general formula

R—X—H according to the following reaction scheme:

R—X—H + ClSCFCl$_2$ → R—X—SCFCl$_2$

In the formula R stands for an optionally substituted aliphatic radical, an alkoxy alkyl radical, an alkyl-thio radical as well as for a

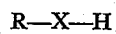

radical in which R″ stands for an alkyl radical, an alkyl-thio radical and an amino group and Y stands for sulfur or a N—R′ radical.

R further stands for a cycloaliphatic, aromatic and heterocyclic radical. X stands for oxygen, sulfur and the N—R′ radical where R′ stands for hydrogen, an aliphatic, cycloaliphatic or aromatic radical and NR′ taken together with R stands for a 5 to 6 membered heterocyclic ring system.

If R represents an aliphatic radical it preferably stands for an aliphatic radical containing 1 to 12 carbon atoms. This radical may be substituted by halogen. If R represents an aromatic radical this radical may further be substituted by halogen or the nitro group. If R represents a heterocyclic radical this radical may also contain an aromatic radical adjacent to the heterocyclic radical.

Suitable starting compounds for this process are aliphatic, aromatic or heterocyclic alcohols and mercaptans, phenols, dithiocarbamic acid salts, xanthic acid salts, primary and secondary amines and the like.

The above-mentioned reaction is expediently carried out at room temperature and in an inert solvent in the presence of an acid-binding agent; in most cases the reaction leads to the desired result in aqueous phase with alkali metal or alkaline earth metal salts of the compounds concerned.

Finally the starting compounds can also be reacted with fluoro-dichloro-methane sulphenic acid chloride without addition of an acid acceptor in the hot.

The compounds produced according to the invention may in general be well distilled; some of them are also crystalline.

The following examples are given for the purpose of illustrating the invention.

*Example 1*

15.2 g. of ethylene glycol monomethyl ether are dissolved in 200 ml. of benzene with addition of 22 g. of triethylamine and mixed with 34 g. of fluoro-dichloro-methane sulphenic acid chloride at room temperature. The temperature rises to about 50° C. The amine salt is filtered off with suction, the solution is concentrated in vacuum and the fluoro-dichloro-methane sulphenic acid-(2-methoxy-ethyl ester), distilled, which boils at 72–76° C. at 10 mm. Hg. Yield: 23 g.

This compound kills flies to the extent of 100% in an applied amount of 0.2%.

In the same way the following esters are produced:

|  | B.P. | Percent killed at 0.2% ||
|---|---|---|---|
|  |  | Drosophila | Mites |
| CH$_3$OSCFCl$_2$ | 111–114° C./760 mm. Hg. | 100 |  |
| ClCH$_2$CH$_2$OSCFCl$_2$ | 74–78° C./12 mm. Hg. | 100 |  |
| H$_9$C$_4$OSCFCl$_2$ | 63–68° C./10 mm. Hg. | 100 |  |
| (H$_3$C)$_3$C OSCFCl$_2$ | 52–55° C./10 mm. Hg. | 100 |  |
| H$_{25}$C$_{12}$OSCFCl$_2$ | 170–180° C./12 mm. Hg. | 95 | 100 |

*Example 2*

19 g. of phenol and 34 g. of fluoro-dichloro-methane sulphenic acid chloride are dissolved in 100 ml. of benzene and treated dropwise with 21 g. of triethylamine. The temperature rises to about 50° C. It is stirred, filtered off with suction from the amine salt and distilled after removal of the solvent in vacuum. 25 g. of fluoro-dichloro-methane sulphenic acid phenyl ester of B.P. 93–100° C. at 12 mm. Hg, are thus obtained which possesses a 100% activity against flies at 0.2% application.

In an analogous manner there are obtained:

|  | B.P. | Percent killed at 0.2% ||
|---|---|---|---|
|  |  | Drosophila | Mites |
|  | 107–120° C./12 mm. Hg. | 100 |  |
| 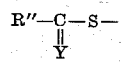 | 142–150° C./13 mm. Hg. | 100 |  |

*Example 3*

21 g. of triethylamine are added dropwise to a solution of 34 g. fluoro-dichloro-methane sulphenic acid chloride and 22 g. of thiophenol in 100 ml. of benzene. The temperature thereby rises to about 40° C. After the usual working up 43 g. of fluoro-dichloro-methane-sulphenic acid thiophenyl ester of B.P. 127–130° C. at 13 mm. Hg are obtained by vacuum distillation, which on application in amounts of 0.2% kills caterpillars to 100% and at 0.02% still possesses a 100% effect against flies.

In an analogous manner fluoro-dichloro-methane sulphenic acid thiododecyl ester is obtained which kills mites at 0.2% application.

*Example 4*

23 g. of 2-mercapto-benzoxazole are dissolved in 200 ml. water with addition of 6.2 g. of sodium hydroxide and mixed at 15–20° C. with 26 g. of fluoro-dichloro-methane sulphenic acid chloride. 35 g. of benzoxazolyl-fluoro-dichloro-methyl disulphide are thus obtained as an oily product. The compound kills flies at a concentration of 0.2% to the extent of 100%.

In an analogous manner the following disulphides are obtained:

| | B.P. | Percent killed at 0.2% | | |
|---|---|---|---|---|
| | | Caterpillars | Drosophila | Mites |
| 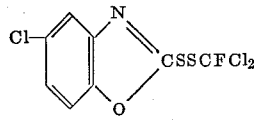 | Oily | | { 100 <br> 100 (0.02) } | |
| 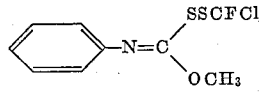 | 169–172° C./11 mm. Hg | | 100 | |

| | B.P. | Percent killed at 0.2% | | |
|---|---|---|---|---|
| | | Caterpillars | Drosophila | Mites |
| 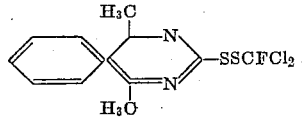 | Oily | 100 | 100 <br> 100 (0.02) | 100 |
| 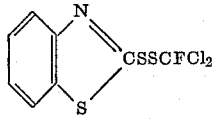 | M.P. 60–63° | | 100 | 100 |
| (CH₃)₂NCSSCFCl₂ <br> ‖ <br> S | Oily | | 100 | |
| H₅C₂OCSSCFCl₂ <br> ‖ <br> S | 124–129° C./13 mm. Hg | 100 | 100 <br> 100 (0.02) | 70 |

*Example 5*

A solution of 34 g. of fluoro-dichloro-methane sulphenic acid chloride in 100 ml. of benzene is treated dropwise at room temperature with a solution of 34 g. of piperidene in 50 ml. of benzene. After removal of the amine salt there are obtained by vacuum distillation 29 g. of fluoro-dichloro-methane sulphenic acid piperidide of B.P. 88–89° C. at 11 mm. Hg, which kills flies to the extent of 100% at 0.2% application.

In an analogous maner there are obtained:

| | B.P. | Percent killed at 0.02% |
|---|---|---|
| | | Drosophila |
| 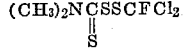 | 126–127° C./11 mm. Hg | 100 |
| 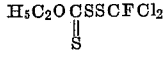 | Oily | 100 |

We claim:

1. A compound of the formula $$R-X-S-CFCl_2$$

wherein R is a member selected from the group consisting of benzoxazolyl, and monochloro-benzoxazolyl; and X is a sulfur atom.

2. A compound of the formula $$R-X-S-CFCl_2$$

wherein R is benzthiazolyl and X is a sulfur atom.

3. A compound having the formula

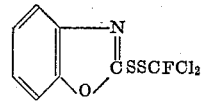

4. A compound having the formula

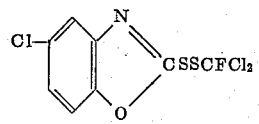

5. A compound having the formula

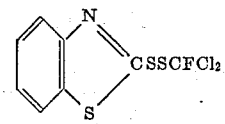

(References on following page)

References Cited by the Examiner

UNITED STATES PATENTS 2,553,777  5/1951  Hawley et al. _____ 260—306.5
2,862,946  12/1958  Kharasch _____ 260—456

FOREIGN PATENTS 1,241,754  8/1960  France.

OTHER REFERENCES

Frear et al., "J. Econ. Entomology," vol. 40, pp. 736–741 (1947).

Sheppard et al., "J. Chem. Soc.," vol. 82, pp. 5106–7 (1960).

NICHOLAS S. RIZZO, *Primary Examiner.*

ALTON D. ROLLINS, *Assistant Examiner.*